(12) United States Patent
Nowotarski et al.

(10) Patent No.: US 8,718,121 B2
(45) Date of Patent: May 6, 2014

(54) TEST DEVICE AND METHOD OF DETECTING AN IMBALANCE IN A POWER LEVEL OF A CHANNEL

(75) Inventors: Adam A. Nowotarski, Indianapolis, IN (US); Pingnan Shi, Greenwood, IN (US); Walter Miller, Greenwood, IN (US); Gregory W. Massey, Greenfield, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 901 days.

(21) Appl. No.: 12/571,777

(22) Filed: Oct. 1, 2009

(65) Prior Publication Data

US 2010/0014572 A1    Jan. 21, 2010

Related U.S. Application Data

(63) Continuation-in-part of application No. 11/856,921, filed on Sep. 18, 2007, now Pat. No. 7,792,183.

(60) Provisional application No. 61/103,382, filed on Oct. 7, 2008, provisional application No. 60/829,181, filed on Oct. 12, 2006.

(51) Int. Cl.
*H04N 7/173* (2011.01)
*H04B 3/46* (2006.01)
*H04Q 1/20* (2006.01)

(52) U.S. Cl.
USPC ........... 375/224; 375/228; 375/219; 725/107; 725/38

(58) Field of Classification Search
USPC ......... 375/224–228, 219, 211, 213, 295, 296, 375/297, 345, 344, 222, 340, 346, 375/240.26–240.27; 725/37, 38, 59, 62, 725/111, 107, 120
See application file for complete search history.

(56) References Cited

U.S. PATENT DOCUMENTS

| 5,684,922 | A  | * | 11/1997 | Miyakawa et al. | 704/229 |
| 6,377,552 | B1 | * | 4/2002  | Moran et al.    | 370/241 |
| 6,611,795 | B2 |   | 8/2003  | Cooper          | 702/191 |
| 7,032,159 | B2 |   | 4/2006  | Lusky et al.    | 714/774 |
| 7,142,609 | B2 |   | 11/2006 | Terreault et al.| 375/261 |
| 7,403,486 | B2 |   | 7/2008  | Flask           | 370/241 |
| 7,489,641 | B2 |   | 2/2009  | Miller et al.   | 370/241.1 |
| 2001/0026579 | A1 | * | 10/2001 | Mollenkopf et al. | 375/141 |
| 2003/0179821 | A1 |   | 9/2003  | Lusky et al.    | 375/224 |

(Continued)

FOREIGN PATENT DOCUMENTS

WO     2006/085275     8/2006    ............... H04L 1/20

*Primary Examiner* — Sam K Ahn
*Assistant Examiner* — Linda Wong
(74) *Attorney, Agent, or Firm* — Matthew A. Pequignot; Pequignot + Myers LLC

(57) ABSTRACT

The present invention provides a test device and a method enabling automatic detection of an imbalance in a power level of a channel. The test device includes a tuner, a power-level measurement system, and an evaluation unit. According to the method, a test channel is selected from a plurality of channels, by means of the tuner. A power level of the test channel and a total power level of the plurality of channels are measured, by means of the power-level measurement system. A ratio of the total power level of the plurality of channels to the power level of the test channel is then evaluated, by means of the evaluation unit, to detect an imbalance in a power level of the test channel.

24 Claims, 11 Drawing Sheets

(56) References Cited

U.S. PATENT DOCUMENTS

| | | | |
|---|---|---|---|
| 2003/0235254 A1* | 12/2003 | Fanson et al. .................. | 375/260 |
| 2005/0144648 A1* | 6/2005 | Gotwals et al. ............... | 725/111 |
| 2005/0193424 A1* | 9/2005 | Matsuura ...................... | 725/127 |
| 2005/0281200 A1 | 12/2005 | Terreault ....................... | 370/241 |
| 2005/0286436 A1 | 12/2005 | Flask ............................ | 370/252 |
| 2005/0286486 A1 | 12/2005 | Miller .......................... | 370/351 |
| 2007/0121712 A1 | 5/2007 | Okamoto ...................... | 375/222 |
| 2007/0275686 A1 | 11/2007 | Stevenson et al. .......... | 455/234.1 |
| 2008/0089402 A1 | 4/2008 | Massey et al. ................ | 375/227 |
| 2009/0086028 A1 | 4/2009 | Miller et al. .................. | 348/180 |

* cited by examiner

TEST DEVICE AND METHOD OF DETECTING AN IMBALANCE IN A POWER LEVEL OF A CHANNEL

CROSS-REFERENCE TO RELATED APPLICATIONS

This application is a continuation-in-part of U.S. patent application Ser. No. 11/856,921 to Massey et al. filed on Sep. 18, 2007, now U.S. Pat. No. 7,792,183 which claims priority from U.S. patent application Ser. No. 60/829,181 filed Oct. 12, 2006 to Massey et al. which are incorporated herein by reference for all purposes. The present invention also claims priority from U.S. Provisional Patent Application No. 61/103,382 to Nowotarski et al., filed on Oct. 7, 2008, which is incorporated herein by reference for all purposes.

TECHNICAL FIELD OF THE INVENTION

The present invention relates to test devices for analog/digital cable television (CATV) systems and to methods of testing analog/digital CATV systems.

BACKGROUND OF THE INVENTION

A typical analog/digital cable television (CATV) system provides a plurality of channels, including both analog channels and digital channels, to consumers. Ideally, the analog channels should have power levels that are substantially equal in magnitude, as should the digital channels, the power levels of the digital channels being appropriately lower than the power levels of the analog channels.

However, problems in the CATV system, such as defective cable, poor maintenance, and poor setup, may lead to an imbalance in a power level of a channel. As a result, reception of the channel by the consumer may be impaired. For example, if a power level of a digital channel is too low relative to respective power levels of a plurality of channels, a set-top box or a TV tuner may generate spurious signals when tuned to the digital channel. To improve reception of the channel, the imbalance in the power level of the channel must be first detected and then corrected through maintenance, repair, or power-level rebalancing.

Conventional methods of detecting an imbalance in a power level of a channel require a user to measure respective power levels of a plurality of channels, including the channel in question, by using a sweep meter or a spectrum analyzer, for example, and to then interpret the measured power levels. However, correct interpretation of the measured power levels necessitates a certain degree of experience, knowledge, and skill on the part of the user. Thus, a test device and a method enabling automatic detection of an imbalance in a power level of a channel are desired.

Unfortunately, existing test devices for analog/digital CATV systems, such as those disclosed in U.S. Pat. No. 7,489,641 to Miller et al. issued on Feb. 10, 2009, in U.S. Pat. No. 7,403,486 to Flask issued on Jul. 22, 2008, in U.S. Pat. No. 7,142,609 to Terreault et al., issued on Nov. 28, 2006, in U.S. Patent Application Publication No. 2009/0086028 to Miller et al., published on Apr. 2, 2009, in U.S. Patent Application Publication No. 2008/0089402 to Massey et al., published on Apr. 17, 2008, in U.S. Patent Application Publication No. 2007/0275686 to Stevenson et al., published on Nov. 29, 2007, in U.S. Patent Application Publication No. 2007/0121712 to Okamoto published on May 31, 2007, and in U.S. Patent Application Publication No. 2005/0286486 to Miller published on Dec. 29, 2005, which are incorporated herein by reference, do not provide such an automatic detection capability.

SUMMARY OF THE INVENTION

An object of the present invention is to overcome the shortcomings of the prior art by providing a test device and a method enabling automatic detection of an imbalance in a power level of a channel.

Accordingly, the present invention relates to a test device for detecting an imbalance in a power level of a channel, comprising: a tuner for selecting a test channel from a plurality of channels; a power-level measurement system for measuring a power level of the test channel and a total power level of the plurality of channels; and an evaluation unit for evaluating a ratio of the total power level of the plurality of channels to the power level of the test channel to detect an imbalance in the power level of the test channel.

Another aspect of the present invention relates to a method of detecting an imbalance in a power level of a channel, comprising: selecting a test channel from a plurality of channels; measuring a power level of the test channel and a total power level of the plurality of channels; and evaluating a ratio of the total power level of the plurality of channels to the power level of the test channel to detect an imbalance in the power level of the test channel.

BRIEF DESCRIPTION OF THE DRAWINGS

The present invention will be described in greater detail with reference to the accompanying drawings, wherein.

DETAILED DESCRIPTION OF THE INVENTION

Figure 1:
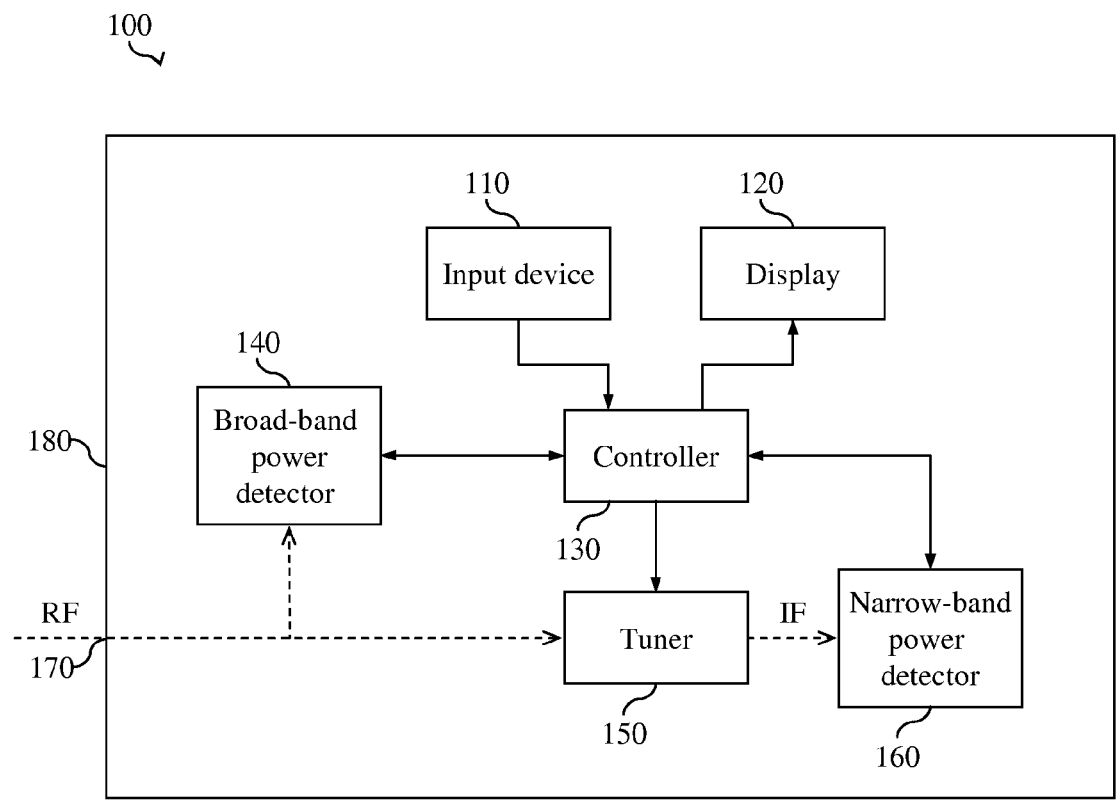
FIG. 1 is a block diagram of a first embodiment of a test device according to the present invention.
Figure 2:
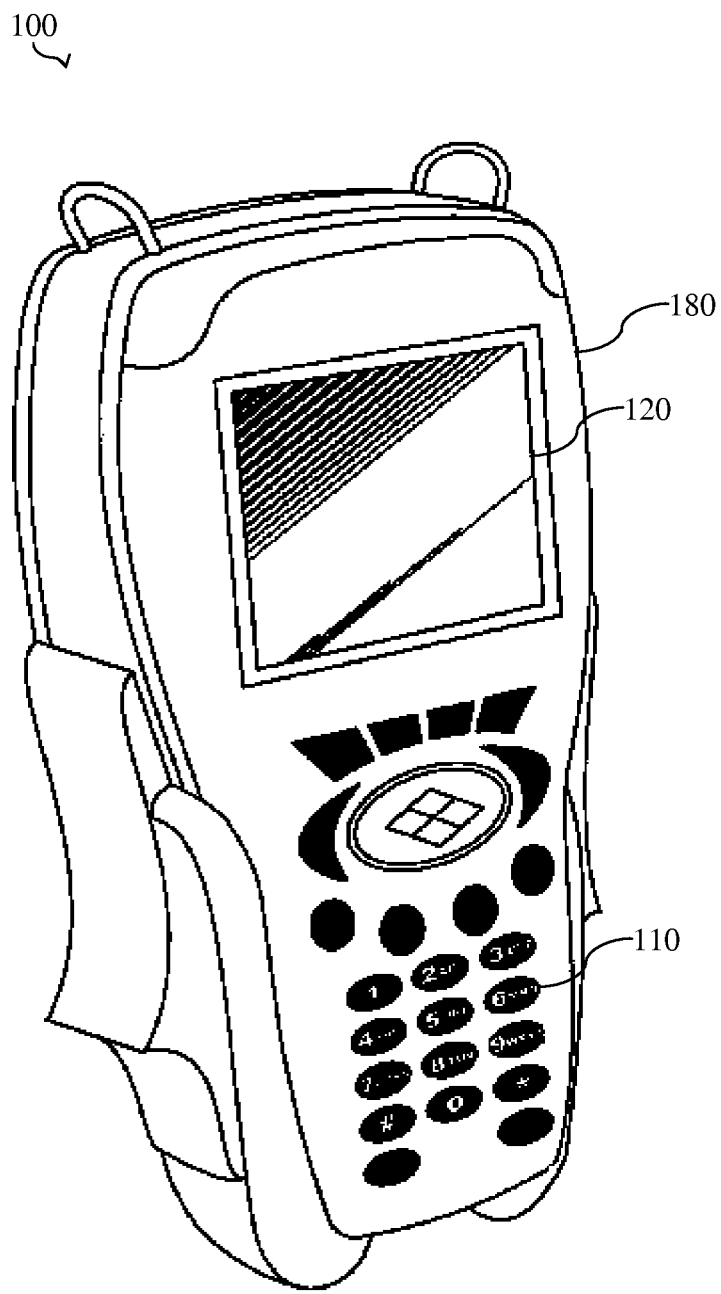
FIG. 2 is a schematic illustration of a front view of the test device of FIG. 1.
Figure 3:
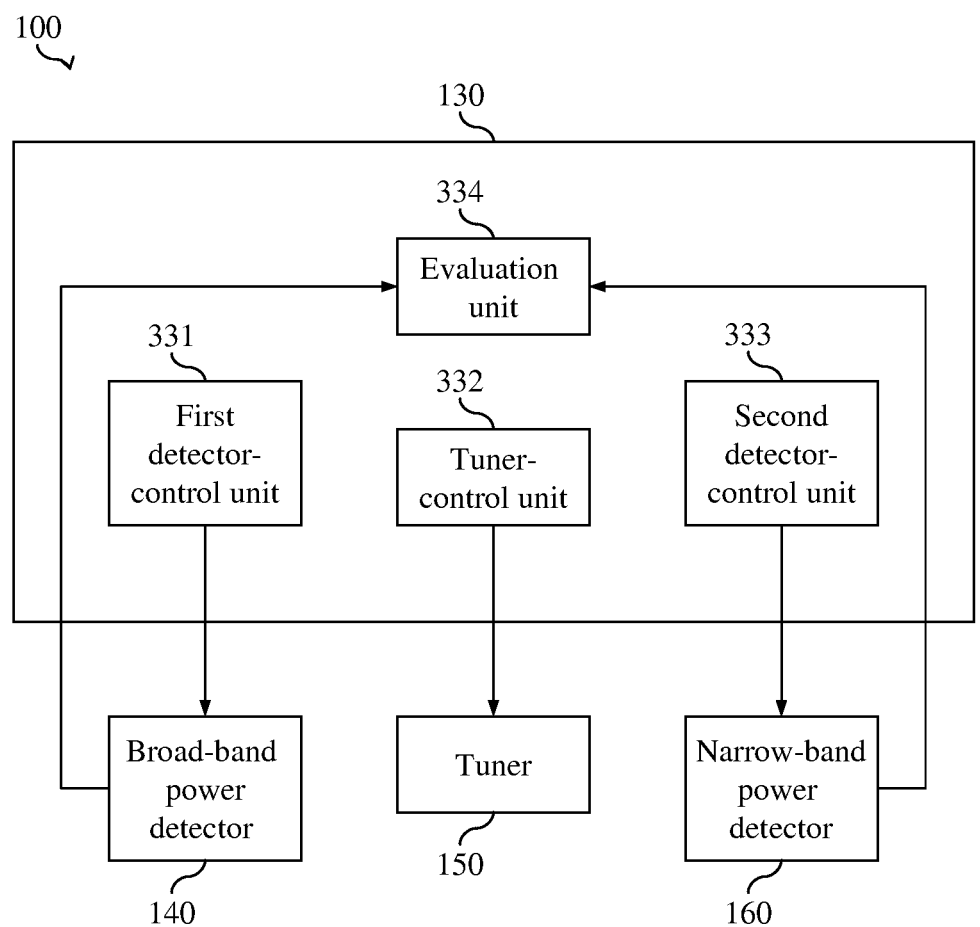
FIG. 3 is a block diagram of a portion of the test device of FIG. 1.

The present invention provides a test device for detecting an imbalance in a power level of a channel. With reference to FIGS. 1 to 3, a first embodiment of the test device 100 includes an input device 110, a display 120, a controller 130, a broad-band power detector 140, a tuner 150, a narrow-band power detector 160, and a radio frequency (RF) coupler 170, all of which are supported by a common housing 180. In particular, the broad-band power detector 140 and the narrow-band power detector 160 are included in a power-level measurement system of the test device 100.

Preferably, the test device 100 is hand-held; however, this feature is not a requirement. In some instances, one or more of the specified components are external to the housing 180. For example, the input device 110, the display 120, and the controller 130 may be supported by a separate housing.

The input device 110 and the display 120 are connected to the controller 130, and serve as an interface between a user and the test device 100. The input device 110, which may be a keypad, a keyboard, a mouse, or the like, enables information to be communicated from the user to the controller 130. The display 120, which may be a screen, an indicator light, or the like, enables information to be communicated from the controller 130 to the user. In particular, the display 120 is capable of indicating an imbalance in a power level of a channel. In some instances, the input device 110 and the display 120 are combined, for example, as a touch-screen.

The controller 130 is also connected to the broad-band power detector 140, the tuner 150, and the narrow-band power detector 160, and includes a first detector-control unit 331, which is configured to control the broad-band power detector 140, a tuner-control unit 332, which is configured to control the tuner 150, and a second detector-control unit 333, which is configured to control the narrow-band power detector 160. In addition, the controller 130 includes an evaluation unit 334, which is configured to detect an imbalance in a power level of a channel. Preferably, the controller 130 is equipped with non-volatile memory for storing programs and configuration data.

The RF coupler 170 is connected to the tuner 150, and the tuner 150 is connected to the narrow-band power detector 160, forming a signal path. The RF coupler 170 enables the user to couple the test device 100 to a coaxial cable carrying a composite RF signal. Thereby, a plurality of channels in a cable system, preferably, an analog/digital cable television (CATV) system, may be accessed. The plurality of channels may correspond to an entire channel plan or to a subset of the channel plan. Typically, the plurality of channels includes one or more analog channels and one or more digital channels.

The broad-band power detector 140 is coupled to the signal path between the RF coupler 170 and the tuner 150. The broad-band power detector 140, which is included in the power-level measurement system, is capable of measuring a total power level of the plurality of channels. Preferably, the user initiates a test measurement via the input device 110. The first detector-control unit 331 of the controller 130 directs the broad-band power detector 140 to detect the total power level of the plurality of channels, and the broad-band power detector 140 then communicates the total power level to the evaluation unit 334 of the controller 130.

The composite RF signal is fed from the RF coupler 170 to the tuner 150. The tuner 150 is capable of selecting a channel to be tested, hereafter referred to as the test channel, from the plurality of channels. In most instances, the test channel is a digital channel, which is, typically, modulated by a form of quadrature amplitude modulation (QAM), for example, 64-QAM or 256-QAM. Preferably, the user communicates the test channel to be selected to the tuner-control unit 332 of the controller 130 via the input device 110. The tuner-control unit 332 then directs the tuner 150 to tune to the test channel. Preferably, the tuner 150 is a superheterodyne receiver, which is also capable of converting the test channel to an intermediate frequency (IF) signal.

The IF signal is fed from the tuner 150 to the narrow-band power detector 160. The narrow-band power detector 160, which is included in the power-level measurement system, is capable of measuring a power level of the test channel. The second detector-control unit 333 of the controller 130 directs the narrow-band power detector 160 to detect the power level of the test channel, and the narrow-band power detector 160 communicates the power level to the evaluation unit 334 of the controller 130.

The evaluation unit 334 of the controller 130 is configured to evaluate a ratio k of the total power level $P_T$ of the plurality of channels to the power level $P_t$ of the test channel to detect an imbalance in the power level of the test channel. The ratio k may be expressed according to Equation (1):

$$k = \frac{P_T}{P_t}, \qquad (1)$$

or in decibels, according to Equation (2):

$$k(\text{dB}) = 10\log_{10}\frac{P_T}{P_t} = P_T(\text{dB}) - P_t(\text{dB}). \qquad (2)$$

For a balanced 64-QAM digital channel, the ratio is, typically, between 20 dB and 25 dB; for a balanced 256-QAM digital channel, the ratio is, typically, between 25 dB and 31 dB.

Preferably, the evaluation unit 334 of the controller 130 includes a first comparator for comparing the ratio to an upper threshold, which is empirically predetermined. If the ratio exceeds the upper threshold, that is, if the power level of the test channel is too low relative to the total power level of the plurality of channels, the evaluation unit 334 determines that the test channel is imbalanced. More preferably, the evaluation unit 334 also includes a second comparator for comparing the ratio to a lower threshold, which is empirically predetermined. If the ratio is below the lower threshold, that is, if the power level of the test channel is too high relative to the total power level of the plurality of channels, the evaluation unit 334, likewise, determines that the test channel is imbalanced.

If an imbalance in the power level of the test channel is detected by the evaluation unit 334 of the controller 130, the evaluation unit 334 communicates the imbalance to the display 120, which indicates the imbalance to the user.

Figure 4:
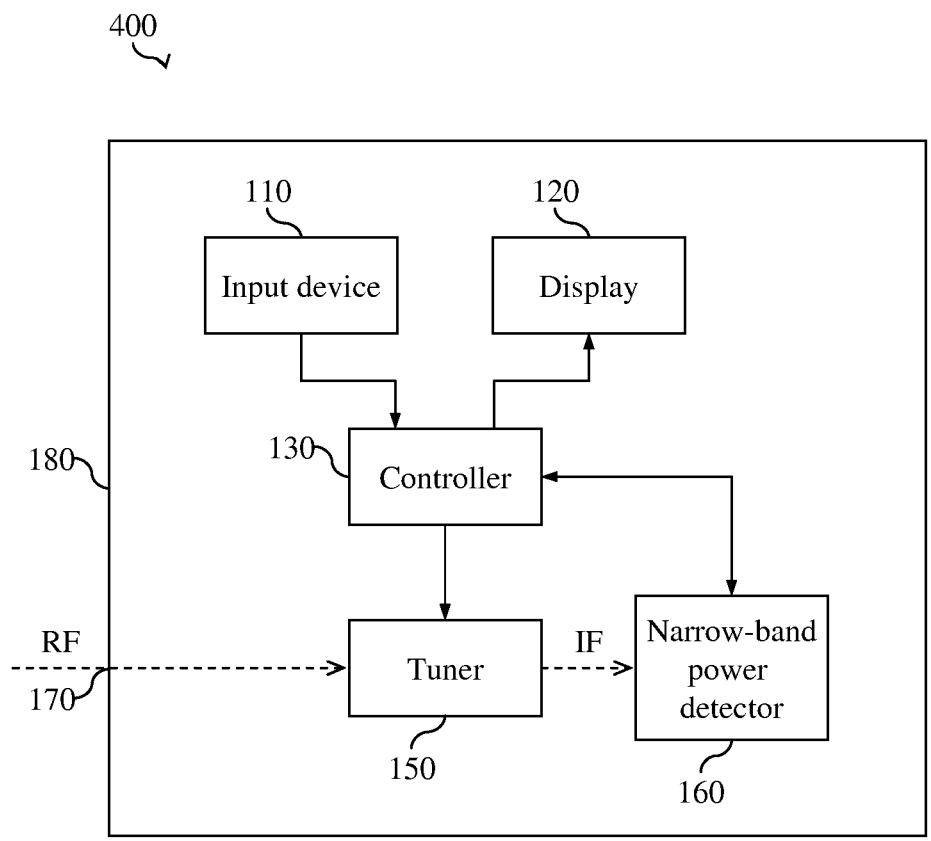
FIG. 4 is a block diagram of a second embodiment of the test device.

With reference to FIG. 4, a second embodiment of the test device 400 includes all of the components of the first embodiment of the test device 100, except the broad-band power detector 140 and the first detector-control unit 331 of the controller 130. In particular, only the narrow-band power detector 160 is included in the power-level measurement system of the test device 400. The narrow-band power detector 160 is capable of measuring both the power level of the test channel and the total power level of the plurality of channels, as explained hereafter.

In the second embodiment, the tuner-control unit 332 of the controller 130 is programmed to direct the tuner 150 to successively select the test channel and each other channel from the plurality of channels, and the second detector-control unit 333 of the controller 130 is programmed to direct the narrow-band power detector 160 to successively measure the power level of the test channel and a respective power level of each other channel. Upon initiation of a test measurement by the user, the tuner-control unit 332 directs the tuner 150 to tune to each of the plurality of channels, including the test channel, in succession. As each of the plurality of channels is selected, the second detector-control unit 333 directs the narrow-band power detector 160 to detect the power level of the selected channel, and the narrow-band power detector 160 communicates the power level of the selected channel to the evaluation unit 334 of the controller 130.

Furthermore, in the second embodiment, the evaluation unit 334 of the controller 130 is programmed to sum the power level of the test channel and the respective power level of each other channel of the plurality of channels to determine the total power level of the plurality of channels. The total power level $P_T$ may be expressed as a summation of the respective power levels $P_i$ of the plurality n of channels, according to Equation (3):

$$P_T = \sum_{i=1}^{n} P_i, \quad (3)$$

or in decibels, according to Equation (4):

$$P_T(dB) = 10\log_{10}\left[\sum_{i=1}^{n} 10^{\left(\frac{P_i(dB)}{10}\right)}\right]. \quad (4)$$

Equation (3) or (4) may be substituted into Equation (1) or (2), as appropriate, to determine the ratio of the total power level of the plurality of channels to the power level of the test channel. The evaluation unit 334 then evaluates the ratio, as explained heretofore, to detect an imbalance in the power level of the test channel.

Figure 5:
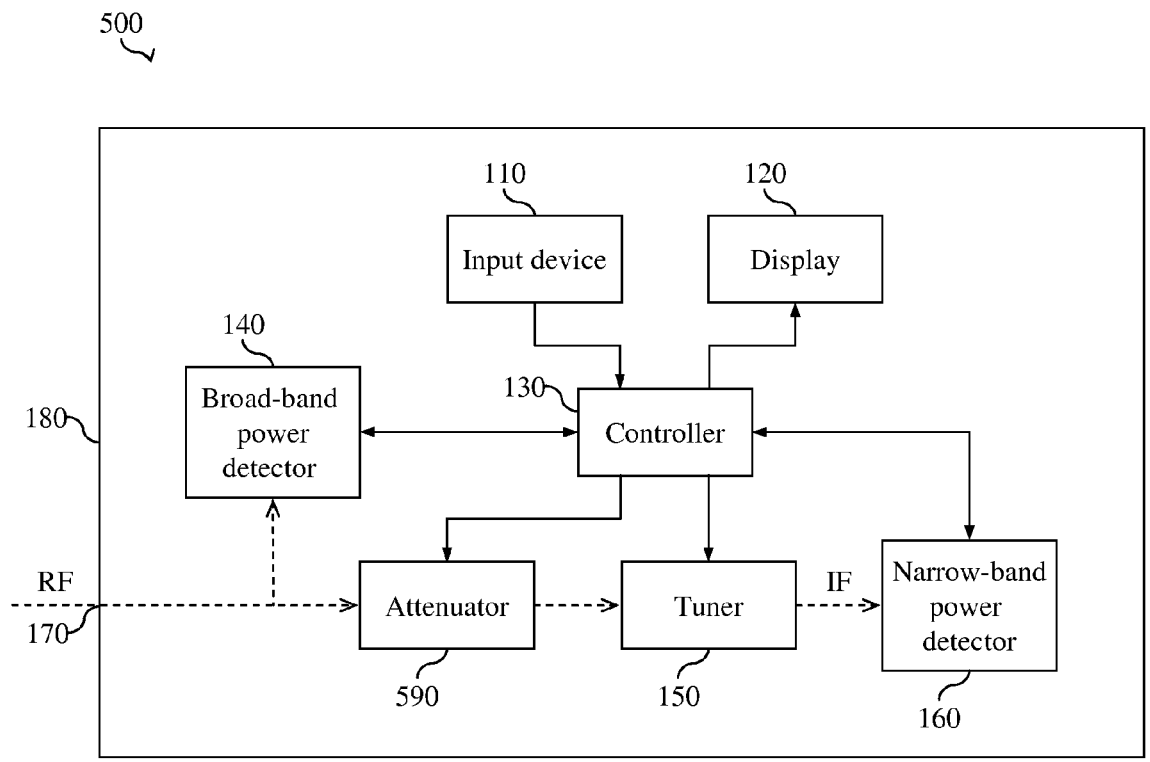
FIG. 5 is a block diagram of a third embodiment of the test device.
Figure 6:
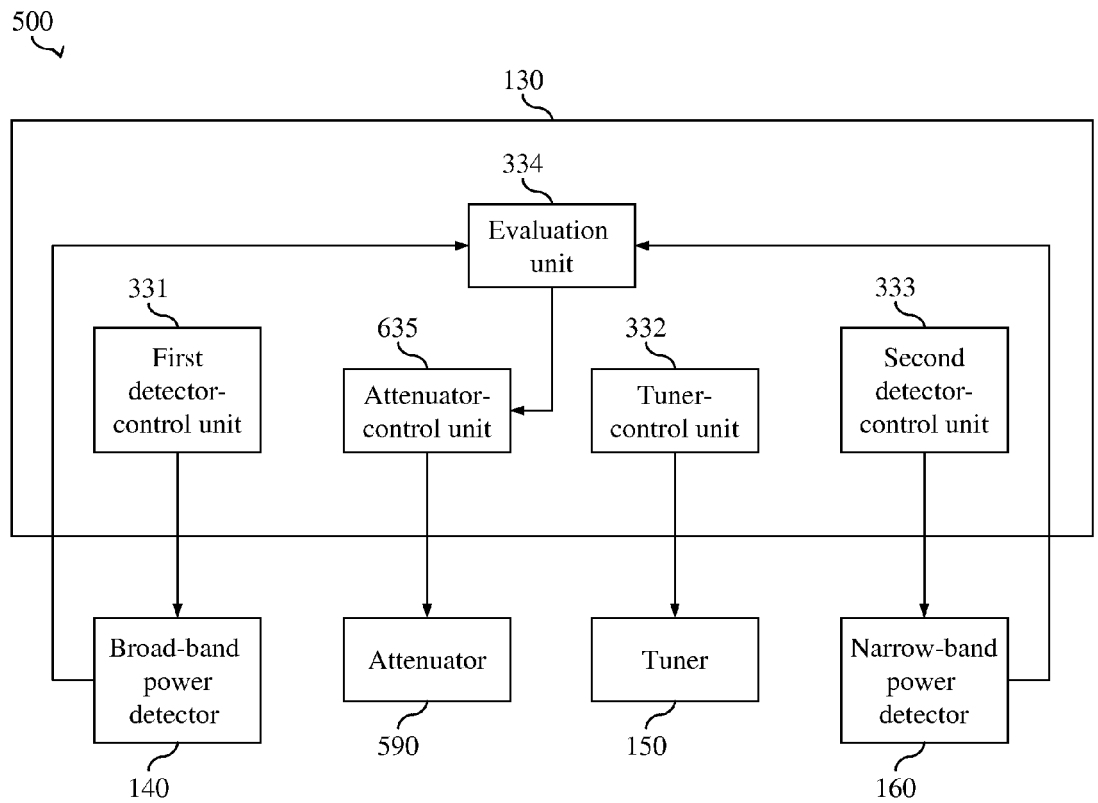
FIG. 6 is a block diagram of a portion of the test device of FIG. 5.
Figure 7:
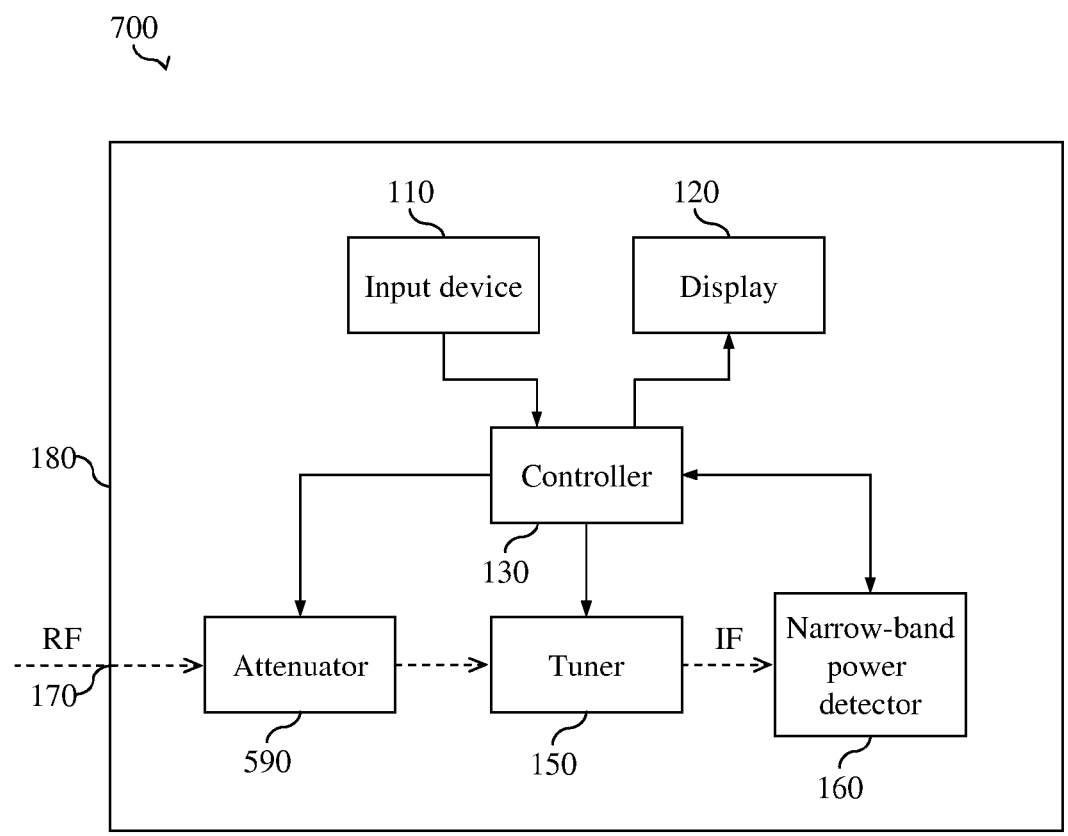
FIG. 7 is a block diagram of a fourth embodiment of the test device.

With reference to FIGS. 5 and 6, a third embodiment of the test device 500 includes an attenuator 590, in addition to the components of the first embodiment of the test device 100. Likewise, with reference to FIG. 7, a fourth embodiment of the test device 700 includes the attenuator 590, in addition to the components of the second embodiment of the test device 400. Preferably, the attenuator 590 is supported by the housing 180.

In the third and fourth embodiments, the controller 130 is connected to the attenuator 590 and includes an attenuator-control unit 635, which is configured to control the attenuator 590. The attenuator 590 is also connected to the RF coupler 170 and the tuner 150 in the signal path, downstream of the broad-band power detector 140 in the fourth embodiment. Thus, the composite RF signal is fed from the RF coupler 170 to the attenuator 590, which is capable of attenuating the plurality of channels at an attenuation level. The attenuator-control unit 635 of the controller 130 directs the attenuator 590 to attenuate the plurality of channels at the attenuation level, and the attenuator 590 reduces the respective power levels of the plurality of channels to a substantially equal extent. The composite RF signal is then fed from the attenuator 590 to the tuner 150.

Furthermore, in the third and fourth embodiments, the attenuator-control unit 635 of the controller 130 is programmed to adjust the attenuation level to compensate for an imbalance in the power level of the test channel. If an imbalance in the power level of the test channel is detected by the evaluation unit 334 of the controller 130, the evaluation unit 334 communicates the imbalance to the attenuator-control unit 635, which adjusts the attenuation level at which the plurality of channels are attenuated.

Preferably, the attenuator-control unit 635 of the controller 130 is programmed to increase the attenuation level when the ratio of the total power level of the plurality of channels to the power level of the test channel exceeds the upper threshold. Typically, the attenuation level is increased by between 4 dB and 6 dB, from an initial attenuation level of between 4 dB and 8 dB. Advantageously, when the power level of the test channel is too low relative to the total power level of the plurality of channels, an increase in attenuation level reduces intermodulation distortion arising from the tuner 150, thereby, compensating for the imbalance in the power level of the test channel in subsequent test measurements on the test channel.

Figure 8:
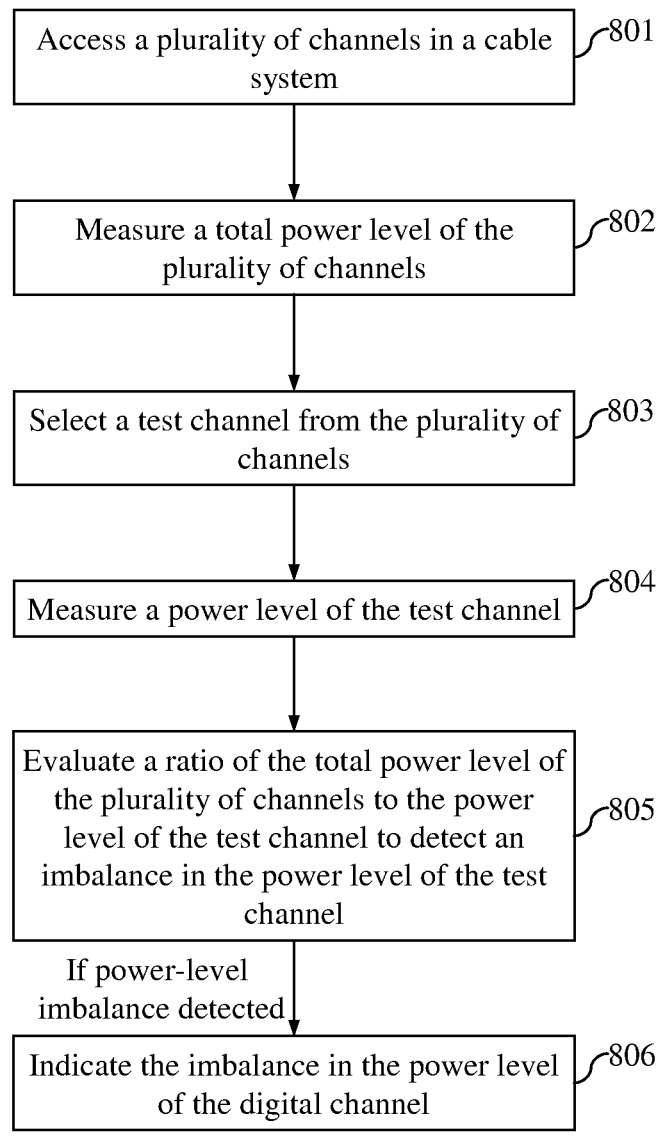
FIG. 8 is a flowchart depicting a first embodiment of a method according to the present invention.

The present invention also provides a method of detecting an imbalance in a power level of a channel. A first embodiment of the method is, preferably, carried out by using the test device 100. With reference to FIG. 8, in an access step 801, a plurality of channels are accessed in a cable system, by means of the RF coupler 170. In a first measurement step 802, a total power level of the plurality of channels is measured, by means of the broad-band power detector 140 of the power-level measurement system. In a selection step 803, a test channel is selected from the plurality of channels, by means of the tuner 150. In a second measurement step 804, a power level of the test channel is measured, by means of the narrow-band power detector 160 of the power-level measurement system. In an evaluation step 805, a ratio of the total power level of the plurality of channels to the power level of the test channel is evaluated, by means of the evaluation unit 334 of the controller 130, to detect an imbalance in the power level of the test channel. If a power-level imbalance is detected, the imbalance in the power level of the test channel is indicated, by means of the display 120, in a display step 806. In some instances, it may be desirable to successively apply the first embodiment of the method to each of the plurality of channels, by repeating the selection step 803, the second measurement step 804, the evaluation step 805, and the display step 806.

Figure 9:
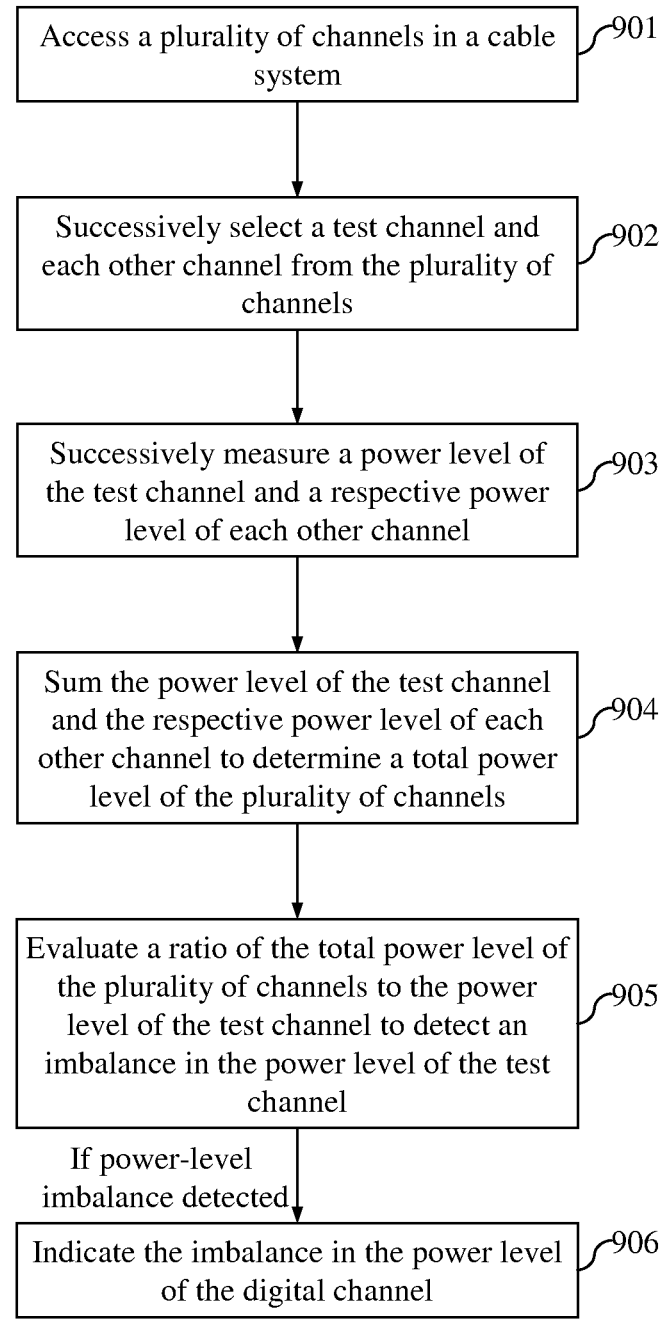
FIG. 9 is a flowchart depicting a second embodiment of the method.

A second embodiment of the method is, preferably, carried out by using the test device 400. With reference to FIG. 9, in an access step 901, a plurality of channels are accessed in a cable system, by means of the RF coupler 170. In a selection step 902, a test channel and each other channel are successively selected from the plurality of channels, by means of the tuner 150. In a measurement step 903, a power level of the test channel and a respective power level of each other channel are successively measured, by means of the narrow-band power detector 160 of the power-level measurement system. In a summation step 904, the power level of the test channel and the respective power level of each other channel are summed to determine a total power level of the plurality of channels, by means of the evaluation unit 334 of the controller 130. In an evaluation step 905, a ratio of the total power level of the plurality of channels to the power level of the test channel is evaluated, by means of the evaluation unit 334, to detect an imbalance in the power level of the test channel. If a power-level imbalance is detected, the imbalance in the power level of the test channel is indicated, by means of the display 120, in a display step 906. In some instances, it may be desirable to successively apply the second embodiment of the method to each of the plurality of channels, by repeating the evaluation step 905 and the display step 906.

Figure 10:
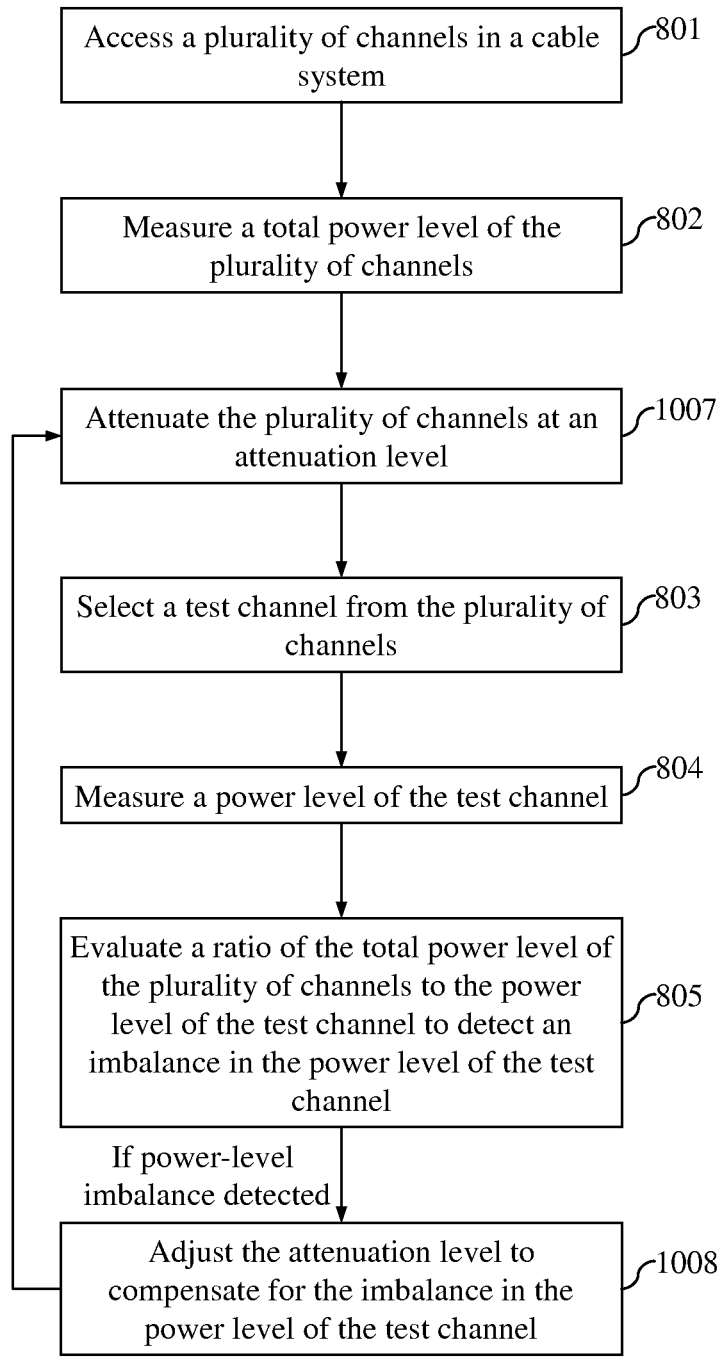
FIG. 10 is a flowchart depicting a third embodiment of the method.
Figure 11:
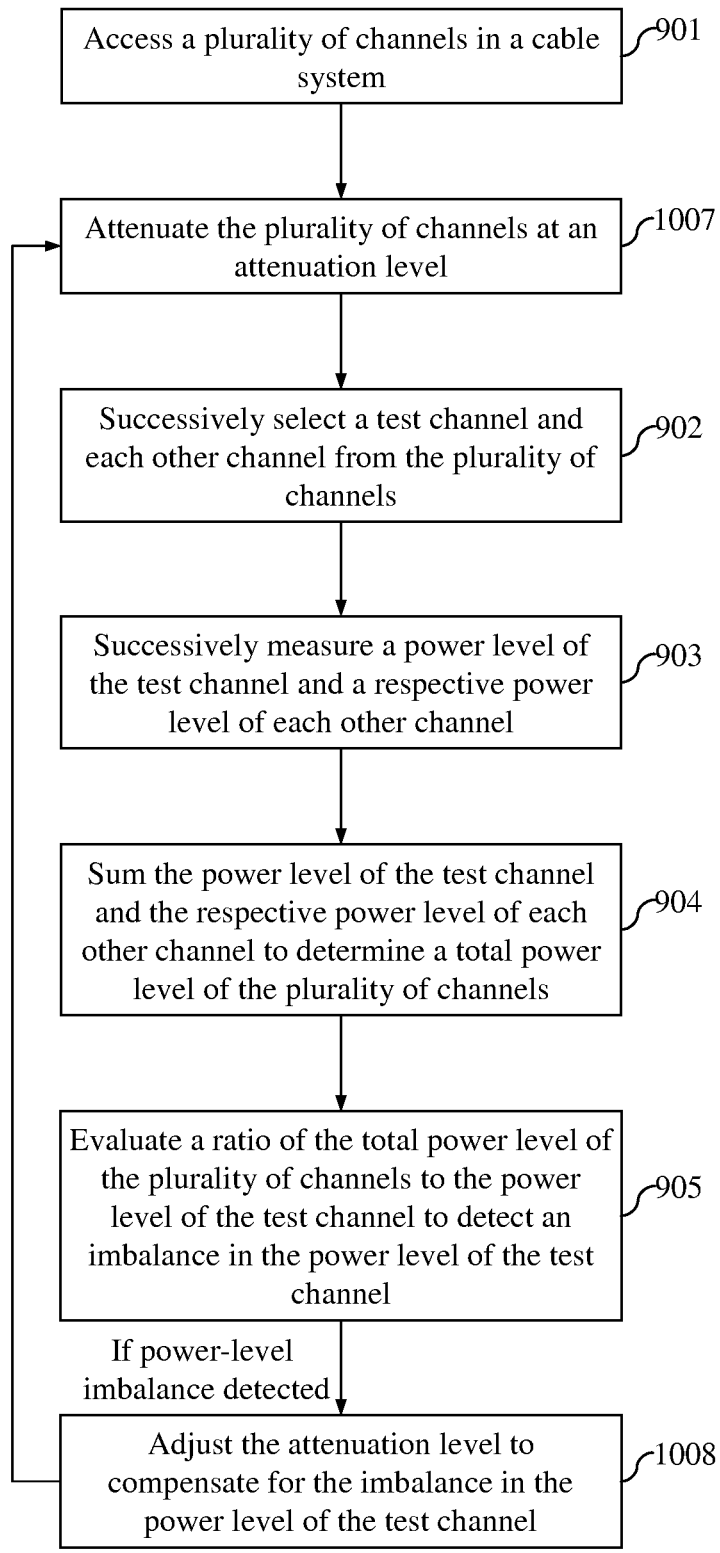
FIG. 11 is a flowchart depicting a fourth embodiment of the method.

With reference to FIG. 10, a third embodiment of the method, which is, preferably, carried out by using the test device 500, includes the access step 801, the first measurement step 802, the selection step 803, the second measurement step 804, and the evaluation step 805 of the first embodiment of the method. Likewise, with reference to FIG. 11, a fourth embodiment of the method, which is, preferably, carried out by using the test device 700, includes the access step 901, the selection step 902, the measurement step 903, the summation step 904, and the evaluation step 905 of the second embodiment of the method. In most instances, the third and fourth embodiments also include the display step 806 or 906.

In the third and fourth embodiments, the plurality of channels are attenuated at an attenuation level, by means of the attenuator 590, in an attenuation step 1007, which is carried out prior to the selection step 803 or 902. If a power-level imbalance is detected, the attenuation level is adjusted to compensate for the imbalance in the power level of the test channel, by means of the attenuator-control unit 635 of the controller 130, in an adjustment step 1008, which is carried out after the evaluation step 805 or 905.

Of course, numerous other embodiments of the test device and the method provided by the present invention may be envisaged without departing from the spirit and scope of the invention.

We claim:

1. A test device for detecting an imbalance in a power level of a channel, comprising:
    a tuner for selecting a test channel from a plurality of channels including the test channel;
    a power-level measurement system for measuring a power level of the test channel and a total power level of the plurality of channels; and
    an evaluation unit for evaluating a ratio of the total power level of the plurality of channels to the power level of the test channel to detect an imbalance in the power level of the test channel.

2. The test device of claim 1, wherein the test channel is a digital channel, and wherein the plurality of channels includes one or more digital channels and one or more analog channels.

3. The test device of claim 1, further comprising a radio frequency (RF) coupler for accessing the plurality of channels in a cable system.

4. The test device of claim 1, wherein the tuner is a super-heterodyne receiver.

5. The test device of claim 1, wherein the power-level measurement system includes a narrow-band power detector for measuring the power level of the test channel, and a broad-band power detector for measuring the total power level of the plurality of channels.

6. The test device of claim 1, wherein the power-level measurement system includes a narrow-band power detector, and wherein the evaluation unit is programmed to sum the power level of the test channel and a respective power level of each other channel of the plurality of channels to determine the total power level of the plurality of channels; further comprising a tuner-control unit for controlling the tuner, wherein the tuner-control unit is programmed to direct the tuner to successively select the test channel and each other channel from the plurality of channels; and a detector-control unit for controlling the narrow-band power detector, wherein the detector-control unit is programmed to direct the narrow-band power detector to successively measure the power level of the test channel and the respective power level of each other channel.

7. The test device of claim 1, wherein the evaluation unit is included in a controller.

8. The test device of claim 1, wherein the evaluation unit includes a comparator for comparing the ratio to a threshold.

9. The test device of claim 1, further comprising a display for indicating the imbalance in the power level of the test channel.

10. The test device of claim 1, further comprising an attenuator for attenuating the plurality of channels at an attenuation level, and an attenuator-control unit for controlling the attenuator, wherein the attenuator-control unit is programmed to adjust the attenuation level to compensate for the imbalance in the power level of the test channel.

11. The test device of claim 10, wherein the evaluation unit includes a comparator for comparing the ratio to an upper threshold, wherein the evaluation unit is programmed to determine that the test channel is imbalanced if the ratio exceeds the upper threshold, and wherein the attenuator-control unit is programmed to increase the attenuation level if the ratio exceeds the upper threshold.

12. A method of detecting an imbalance in a power level of a channel, comprising:
    a) selecting a test channel from a plurality of channels including the test channel;
    b) measuring a power level of the test channel and a total power level of the plurality of channels utilizing a power level measurement system; and
    c) evaluating a ratio of the total power level of the plurality of channels to the power level of the test channel to detect an imbalance in the power level of the test channel.

13. The method of claim 12, wherein the test channel is a digital channel, and wherein the plurality of channels includes one or more digital channels and one or more analog channels.

14. The method of claim 12, further comprising i) accessing the plurality of channels in a cable system.

15. The method of claim 12, wherein a) includes successively selecting the test channel and each other channel from the plurality of channels, and wherein b) includes successively measuring the power level of the test channel and a respective power level of each other channel, further comprising ii) summing the power level of the test channel and the respective power level of each other channel to determine the total power level of the plurality of channels.

16. The method of claim 12, wherein c) includes comparing the ratio to a threshold.

17. The method of claim 12, further comprising iii) indicating the imbalance in the power level of the test channel.

18. The method of claim 12, further comprising iv) attenuating the plurality of channels at an attenuation level, and v) adjusting the attenuation level to compensate for the imbalance in the power level of the test channel.

19. The method of claim 18, wherein c) includes determining whether the ratio exceeds an upper threshold, and determining that the test channel is imbalanced if the ratio exceeds the upper threshold, and wherein v) includes increasing the attenuation level if the ratio exceeds the upper threshold.

20. The method of claim 12, wherein the method is successively applied to each of the plurality of channels.

21. The test device of claim 1, wherein the plurality of channels corresponds to an entire channel plan in a cable television (CATV) system.

22. The test device of claim 8, wherein the threshold is an upper threshold, and wherein the evaluation unit is programmed to determine that the test channel is imbalanced if the ratio exceeds the upper threshold.

23. The method of claim 12, wherein the plurality of channels corresponds to an entire channel plan in a cable television (CATV) system.

24. The method of claim 16, wherein the threshold is an upper threshold, and wherein c) further includes determining that the test channel is imbalanced if the ratio exceeds the upper threshold.

* * * * *